T. Schwartz.
Air Engine.
No. 45,526.    Sheet 1-2 Sheets.    Patented Dec. 20, 1864.
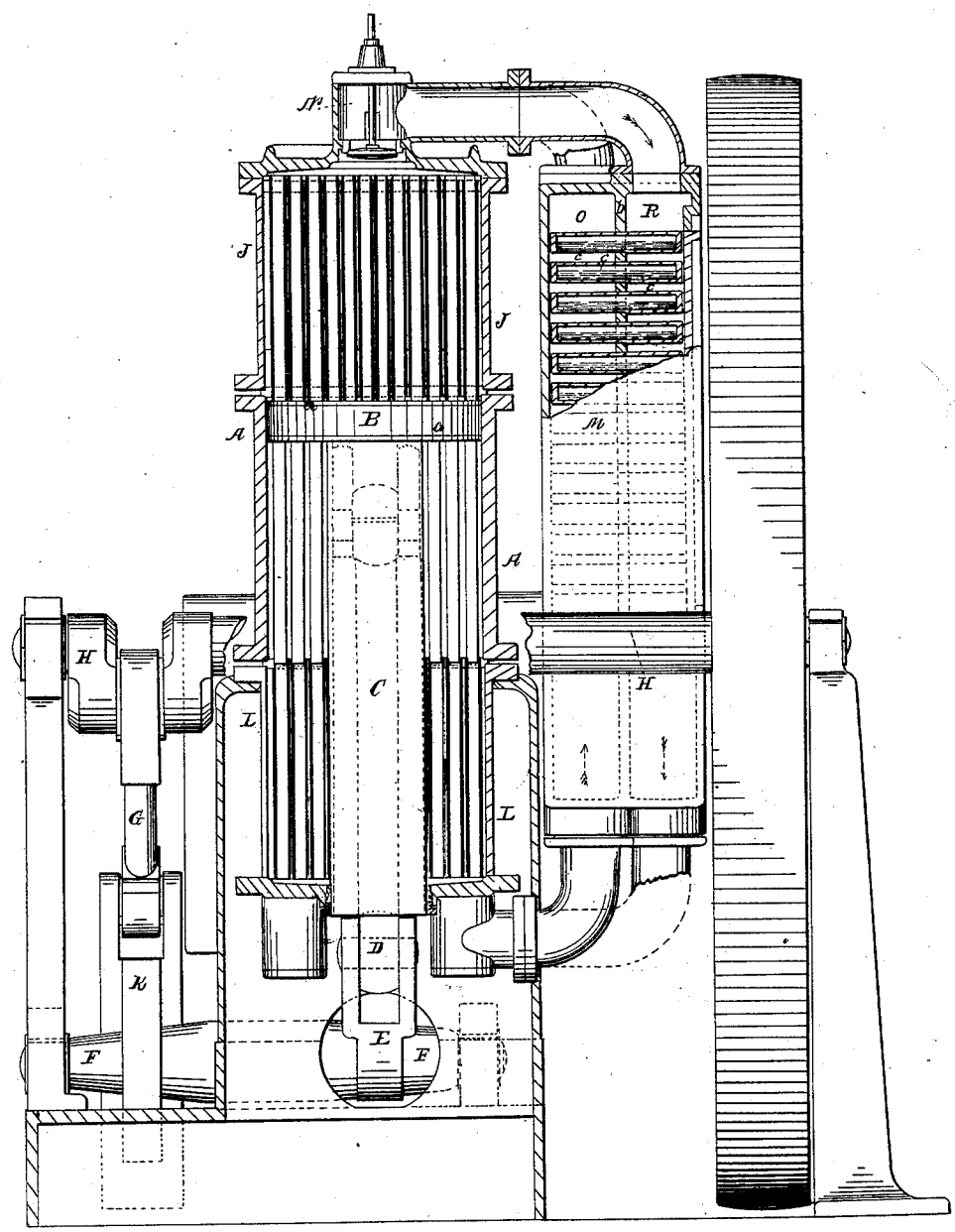
Witnesses:
Charles Mullton.
Frank S. Maulton.
Inventor:
Theodore Schwartz.

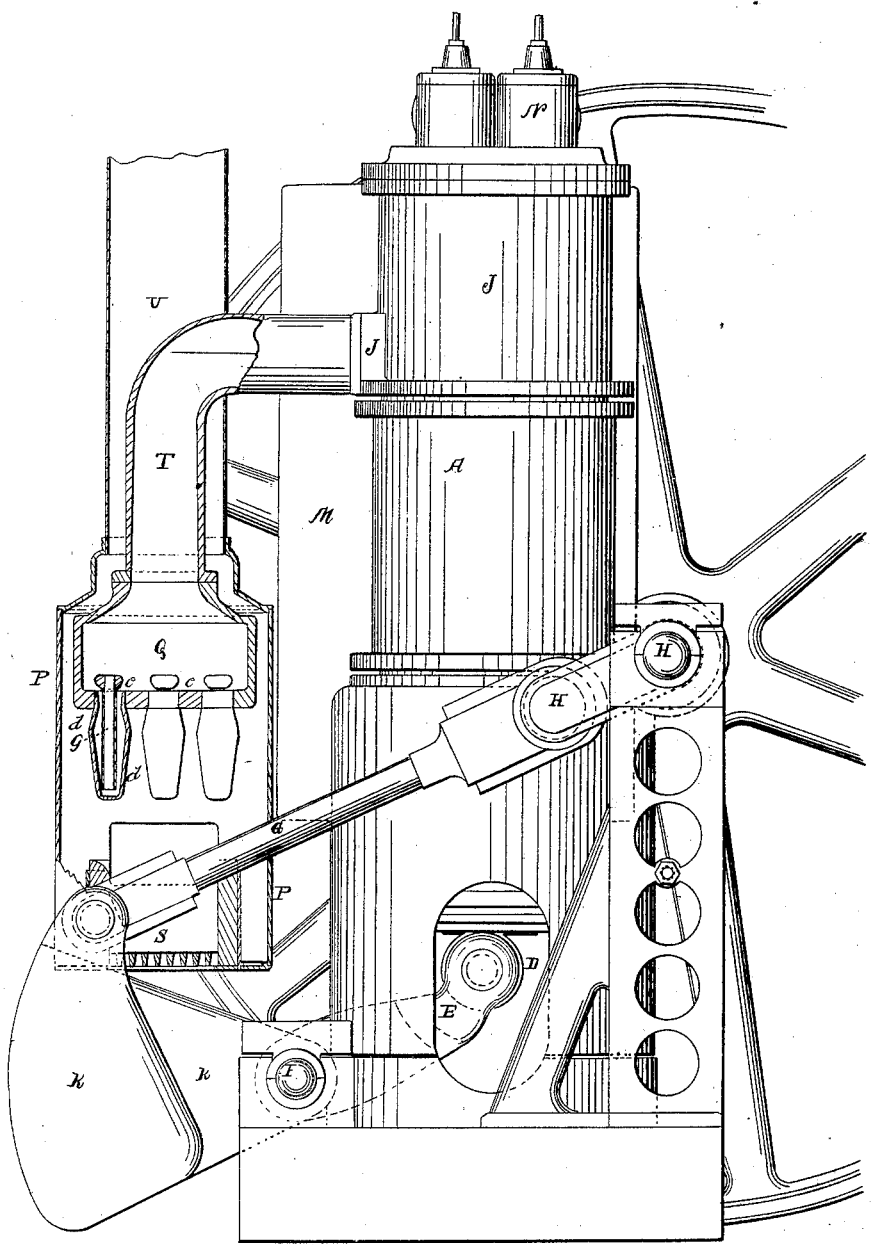

UNITED STATES PATENT OFFICE.

THEODORE SCHWARTZ, OF NEW YORK, N. Y.

IMPROVEMENT IN CALORIC ENGINES.

Specification forming part of Letters Patent No. 45,528, dated December 20, 1864; antedated December 7, 1864.

*To all whom it may concern:*

Be it known that I, THEODORE SCHWARTZ, of the city and State of New York, have invented a new system of engines for obtaining motive power from atmospheric air, which I term a "recuperative caloric engine;" and I do hereby declare that the following is a full, clear, and exact description of the new system of construction and the operation of the same, reference being had to the annexed drawings, making a part of this specification.

The nature and object of this invention is to supersede steam for marine purposes and generally for large engines by endowing air as a motor with greatly increased efficiency and overcoming the cumbrousness hitherto opposed to its adoption, thus premitting the realization of the pre-eminent economy and safety, which are its recognized attributes.

The process of obtaining power from air resolves itself into three chief functions—to wit, compression, dilatation, and expansion—the first and last of which would, at most, neutralize, so as to balance each other in effect, but for the intervening one the augmented volume gained through dilatation by expenditure of heat and elevation of temperature being the source whence is due the development of power, and in which alone this has its existence. As a consequence, the greater the range of dilatation (that is, the number of degrees to be imparted to the compressed air) the more power is obtained and the greater is the efficiency of the motor.

It is well known that any alteration in volume which air may be subjected to is attended by a corresponding change of temperature, compression producing heat, and expansion cooling; hence it follows that in the process of obtaining power the air loses in efficiency by heat evolved in the compression, (as that curtails the range of dilatation,) likewise losing by cooling in the expansion, the latter occasioning a deficit in the return of power, due to the expenditure of compression. The heat from the compression, besides encroaching on the range of dilatation, lessens the effects, per degree, by raising the starting-temperature, for the increment of volume acquired per degree is smaller the higher the temperature, so that a degree imparted to warm air is less effective and profitable than when imparted to cold air.

It is the drawbacks arising as above through the calorific effects of compression and expansion that have operated to render air so nearly valueless as a motor, and which the present invention purposes to remedy. The considerations thus presented are not urged as novel, for while it has been attempted to obviate heating in compression by surrounding the air-pump with cold water, it has also been intended that the amplified form and attendant displacement peculiar to the piston and end bottom of the existing caloric engines should keep up the temperature in the working-cylinder, the benefit realized in this respect being very marked in engines of very small size, yet in both cases the result has been far from satisfying the anticipation.

Up to a comparatively recent investigation by M. Peclet, our data concerning spontaneous transmission of heat have been so vague, contradictory, and incomplete as to cause much confusion and uncertianty, but it is now settled beyond doubt that sudden change of temperature can be effected only through intimate proximity, amounting almost to contact; hence the operating merely from outside of a cylinder would be powerless as a means of inducing spontaneous change of temperature in the space within. Wishing to maintain strictly constant temperature, I propose filling, or virtually to permeate, the working space of each cylinder with metal surface, to be so shaped and conditioned that it receives and supplies heat or cold in a gradual and continuous manner, as required, during the motion of the piston, by following this latter without causing obstruction, thereby so perfectly diffusing and scattering the effect as to extend the same to every particle of air at each portion of the stroke.

The operation of thus keeping up constant or unfluctuating temperature I term "recuperation," and the principal methods for carrying it into effect are the three following:

First method: Injection of liquid the same as in ordinary condensation, the separation and recovery of the liquid being favored by the circumstance that the recuperation is limited to the period of actual compression or expansion, there being a portion of the stroke when no such action is called for. That this expedient is applicable in cooling seems obvious; but its adaptability to heating must depend on what kind of liquid is available for that purpose, it being apparently indispensable that the boiling point of the liquid to be used should be at least as high as the working-temperature of the engine. Of the known bodies realizing that condition may be mentioned paraffinized oil, glycerine, and chloride of zinc, which, being but little known among engineers, claim some brief remarks. The first-named article affords a most desirable lubricating-liquid, and belongs to that extensive class of hydrocarbons known as "petroleum distillates," the boiling-points of which may be said to present a range extending all the way from 176° Fahrenheit to 700° and over. The perfectly neutral character of the oil and its great cheapness much enhance it adaptability. Glycerine (specific gravity 1.28 at 58°) is a neutral limpid liquid, at once stable and persistent in the air, which, through highly sirrupy at ordinary temperature, acquires perfect fluidity when heated. It can bear at least 612° distilling freely without decomposition, the boiling-point of the pure article when free of water approximating to that temperature. It draws water from the atmosphere with great avidity, and holds it so tenaciously as probably not to release the last trace till heated to at least 560° Fahrenheit, and as a consequence it may be had to boil at any desired temperature within the wide range of 212° to 612°. The glycerine is produced by pumping an emulsion of fatty matter in hot water through an iron worm of inch-pipe under excessive pressure at a heat of about 612°, the specific gravity of the article itself causing it to settle in the recipient so as to be tapped off. There remains to be remarked concerning the injection method, that it affords convenient lubrication for the piston, but that in heating it has the objection of wasting liquid by vaporization through leakage of the stuffing-boxes.

Second method: Establishing toward the inside of the cylinder, as an extension of the working-space, a cellular surface structure or amplification to be heated or cooled through outside agency, and agitating within the same the air in progress of expansion or compression through an express rocking gear, which, to increase the effect, may be made in two distinct parts, one fitted to the cells playing with short jerks close to the acting surface, the other to have a tapering movement suited to the stroke, so as to carry the recuperative action up to the piston—in other words, the first part to take off heat or cold from the multiform surface, and the other scattering the effect throughout the working-space. The last-named portion of the rocker (properly the mixer) being to spread and equalize the calorific action, may be in the form of a light circular disk, with perforations like a colander. To secure the requisite amount of surface compactly, the end structure requires to be constituted into a mass of narrow compartments of more or less depth—in other words, forming a multitude of vacancies, cavities, or cells, which may be of annular, tubular, conoidal, or other equivalent shapes. The supplying of heat or cold through external application by end structure, as proposed, is brought about by causing the whole or each separate part of the end structure to be inclosed, made double, or hollowed outward to receive on the reverse side of the acting surface a liquid or vapor or air current for maintaining the wished-for temperature, and to this end may be used some hydrocarbon or other substance affording the necessary range of temperature at convenient pressure free of liability to decomposition. It is proposed to limit the working-temperature of the engine to an average of 450°—never to exceed 500°. In this connection, I propose conveying heat from the furnace to the working-space of the piston through the medium of narrow tubes, sealed at both ends, in which is the inclosed a small portion of liquid, exposing one end of the tube directly to the flame, and transmitting the heat more less directly at the other end to the air to be recuperated, the portion of liquid to be scald up within said tubes affording a most convenient and efficacious medium for propagating heat when more direct action would be objectionable or impracticable. The choice of liquid for the tubes must depend on the heat to be attained and the strength of the metal, water being undesirable at high heat. The intermediary use of liquid or vapor in the recuperation of heat as proposed, it will be perceived, is attended with no consumption, no portion having access so as to commingle with the working current, the application being altogether external, the same as in steam-heating; nor does it create any liability to explosion, for, except when using liquid of extremely elevated boiling-point, the only form of receptacle to be employed is that of narrow tubes, so that the utmost possible pressure could occasion only a harmless splitting. This completes the description and expedients concerning the second mode of recuperation.

Third method: This is founded on external application of heat or cold through end structure the same as the preceding, but substitutes for the rock gear an elongated body, composed of tubes or other equivalent assemblage of surfaces, made to fit the end structure, and which travels back and forward within the same the length of the working-stroke, following the movement of the piston; or, to be more definite, we will suppose the end structure an extension-cylinder, filled with narrow tubes, to be surrounded with liquid, and that a corresponding set of other tubes fitting the stationary ones be fastened to the piston so as to slide in and out, like telescope-tubes. Of course, it is most convenient to fasten the movable tubes, as just said, to the piston, but it would be preferable that they should receive an intermittent movement, allowing them to linger within the end structure for the purpose of gathering heat or cold during the small portion of the stroke when no recuperation is called for, which would render their action all the more effective—an arrangement, however, which entails much complication as well as extra expense. The tubular construction above suggested possesses apparently the best requisites for realization, yet it will devolve on actual experience to define how far it may be practicable otherwise to combine the most efficient recuperative power with the least onerous execution. This concludes the description of the third and last method of recuperation.

The means thus presented for the recuperation of temperature during compression and expansion of air results in signal advantages, the most important of which may be stated as follows: First, the compressed air, when delivered cold from the pump, affords ample range of dilatation at comparatively low-working temperature—that is, without incurring the usual destructive heat of 600°, (nascent red heat), heretofore deemed indispensable, and, moreover, by that very fact permits the engine to be made double-acting, thus relieving it of much of its cumbrousness; second, high pressure, hitherto inapplicable, becomes available to the fullest extent, (it being expected to work at from four to five atmospheres,) of itself a great stride toward obtaining an effective motor; third, by a new operation, presently to be described, the value of which is based wholly on recuperation, considerable vacuum action is secured through combined condensation and rarefaction of volume by an exhaust-pump, not before attempted, the regenerator performing the double service of heater and condenser; fourth, the delivery of the air-pump being cold, and the discharge of the main cylinder retaining full working-temperature, the range for regeneration of heat is greatly enhanced over former attempts.

To sum up, I expect to present, in lieu of an overheated single-acting engine of feeble power and most limited application, a complete double-acting condensing-motor of moderate temperature, as unobjectionable in its working as steam, and which, while being capable of illimited power, offers transcendent economy and safety over steam.

The introduction of the exhaust-pump has for object to create partial vacuum effect by combining with the condensation incident to cooling of the working-current an actual rarefaction through piston, the advantage of the latter being that it engenders an opportunity for valuable recuperation, first, by the loss of heat in distension of air to be made good to reduce the requisite power; secondly, by the accumulation of heat in recompressing the distended air for ejection to be neutralized to reduce the power required in that operation, the working of the pump consisting in alternately rarefying and recompressing the air over and over, each time realizing the twofold gain of power incident to swelling the volume through heat on the rarefying side of the piston, while reducing it through cooling during the recompression on the opposite side. What gives prominent importance to the power thus contributed is, that it is obtained at a cost approximating to the theoretical value of the heat consumed in the operation, the use of such a pump entailing no addition whatever to the aggregate waste from radiation and the chimney. To realize the full benefit of the pump, it should be made as large as comports with the engine-room, and at least equal to the working-cylinder.

The nature and main objects of the recuperative working system having been fully set forth, together with the means of rendering the same operative, there remains to be stated some secondary aims incidental to the perfecting of the new engine, to wit:

Aim 1. The enlarged range of regenerative action afforded, as already explained, being such that the chief heat wanted to swell the volume of the compressed cold air to be worked is had gratis, leaving only a small portion to be supplied, I propose deriving this latter from the waste heat of the chimney, diverting and appropriating to that use from the working-current a certain diminutive portion or branch current, just large enough to receive and convey from the furnace the exact amount of heat so to be furnished, allowing the branch current so established to become heated to 600° or more, and commingling the same with the main air volume at the entrance of the working-cylinder. To illustrate this, suppose that thirteen-fourteenths parts of the main current becomes heated from 60° to 385° in traversing the regenerator, requiring the addition of only 15° to attain the working-temperature of 400°, a branch current equal to one-fourteenth of the whole then if heated in the furnace to 600°, supplies the required 15°, when commingled as proposed, the end thus gained being to diminish the waste of heat in the chimney.

Aim 2. To increase the regeneration of heat beyond the wide range already attained, as stated, at the same time effecting fresh reduction in the waste of the chimney by promoting increased temperature in the furnace, it is proposed to feed the fire with hot air heated through auxiliary regenerator, diverting, to that end, a small portion of the hot exhaust-current of the engine.

Aim 3. To remedy the liability to injury and extra wear of the cylinder-surfaces from dust and grit retained through lubrication, and which is apt to accumulate to such extent as to clog the moving parts, it is of paramount importance that the air be worked over and over without renewal, limiting the actual supply to the inconsiderable item wasted through unavoidable leakage, and which, if necessary, may be divested of dust in the admission. The main difficulty in this object is that the delivery of the exhaust may not correspond either in time or speed with the demands of the air-pump. This I propose remedying by interposing an accommodation-receptacle, capable of freely expanding and contracting in volume without variation of pressure, which, by adapting itself to the conflicting conditions, averages the action. For instance, the receptacle may consist in a vertical cylinder, open at the top, furnished with a tightly-fitting weighted piston, free to rise and to fall; or in place of the cylinder may be employed a funnel-shaped vessel, with pouch like piston, operating like bellows. In either case the vessel requires two small valves, one for admission of air, the other for discharging excess to insure uniform pressure.

Aim 4. To abate the piston-friction, which is apt to be most onerous in working air, especially in the case of very small power, I contemplate a radical change in the construction of the piston. The opinion prevails that the wear and tear of the packing is reduced, so as to enhance its durability by enlarging the width, (that is, by allowing more wearing-surface,) the same as with a shaft-bearing. This I take to be a misapprehension in so far as the tightening-pressure per square inch, which determines the wear, is proportioned, not to an aggregate weight, (as in the case of the shaft,) but to the working-pressure per square inch of the piston, which makes it immaterial whether the packing be wide or narrow; hence I purpose reducing the elastic rubbing-surface considerably below the customary width of packings, expecting thereby greatly to reduce friction without increasing the wear.

With the further view of reducing the friction to strict accordance with the fluctuating working pressure of the piston—a condition more difficult of attainment than is generally allowed—I propose so to alter the construction as to have two independent metal packings instead of one only, as usual—viz., one toward each face of the piston, which allows the acting pressure to have unrestricted access behind the rings, segments, or tightening surfaces of the packing.

This completes the description of working principles constituting my new system of air-engine. The application of those principles opens up a wide field for modification of arrangement. For instance, in a large marine engine it is of foremost importance to attain as much economy of fuel as possible, cost of construction in that case being a secondary consideration, while, on the contrary, in land engines cheapness would be the overruling question in a majority of cases, rendering it advisable to suppress certain otherwise invaluable portions, such as the exhaust-pump and auxiliary heating apparatus.

It is clearly impossible to compass here all the modes of arrangement that suggest themselves as practicable, or even those most desirable under given circumstances, as that would involve hopeless prolixity, every new use having its own conditions; and I limit myself to exhibiting the plan now to be described, which represents a compact form of engine embodying just so much of the new working principles as may be necessary to produce a satisfactory average result without realizing what may be termed the "refinements" of the system.

The letters of reference are the same for like parts in both drawings.

Plate I is a side elevation of the engine, seen from outside; and Plate II, an end elevation showing the principal parts more or less in section.

A is an upright working cylinder, with piston B, the lower end of which is used as air-pump, (i. e., to compress the air to be worked,) while the upper end serves to develop and apply the power by receiving and expanding the prepared air after it has been duly swelled in volume through heat; hence the one cylinder is made to combine the functions of two, one end virtually manufacturing compressed air and the other end utilizing the same, the aim in that arrangement being to simplify the make of the engine, for there is no objection to employing independent double-acting cylinders for each use.

To render practicable the twofold use of the cylinder, I introduce in place of an ordinary piston-rod a hollow cylinder or trunk-piston, C, by which to reduce the pumping area of the piston. The high inside space of the trunk admits the connecting-rod D directly from the arm E of the rock-shaft F—a convenient mode of communicating the piston motion—which from thence is transmitted through the rod G to the fly-wheel shaft H, the heavy body K at the off end of the rock-shaft acting at once as a lever and to balance the weight of the piston and appurtenances. This completes the moving-gear of the engine.

At either end of the working-cylinder A there is an extension-vessel of almost equal size, which is closely filled with stationery five-eighths-inch brass tubes, open at both ends, constituting what I term the "recuperator," the tubes of the lower recuperator, L, being so disposed as to have a stream of cold water constantly circulating around them, (i. e., tightly jointed in appropriate end bottoms,) and those of the upper recuperator, J, to be similarly maintained at the working-temperature of the air through hot liquid from the generator, admitted by the neck $j$, the tubes so established operating in connection with two corresponding sets of moving tubes of very nearly equal size, and which are attached through facing-plates $a$ $a$ to the piston, so as to follow its movement, (sliding back and forward within the stationary tube, like telescope-tubes,) completes the recuperative arrangement.

It will be seen by reference to the drawings that the access of the air to the piston is through the stationary recuperation-tubes, and I have to state that these perform an extra service, those of the hot recuperator imparting to the working-current that last elevation of temperature which the regenerator is inadequate to supply, and the tubes of the cold recuperator completing the operation of cooling the exhaust current to be returned to the air-pump. The transit through the cylinder-bottoms involves the use of valve-boxes like the one, N, shown in section, there being two such at the top, (of course one for each current,) but two pairs (i. e., four boxes united two and two by intercommunication) underneath, the space around the trunk-piston being too narrow for boxes as large as those at the top.

M is the regenerator—a double-chambered flat vessel of considerable capacity, with dividing-partition, b, that traverses vertically from top to bottom. The inner chamber, O, receives the cold product of the air-pump from below and delivers it, heated, at the top, to be worked by the piston, while the outer chamber receives back the heated air after the pressure has been completely exhausted, thence returning it, cooled, at the lower end to the air-pump, to become recompressed, the same air, thus subdivided into two independent currents, circulating back and forward between the ends of the regenerator and the working-cylinder, the object, so far as concerns the regenerator, being to make the same heat serve over and over to the utmost practicable extent by continually transferring it from the exhaust current to the one to be heated. The transfer so to be effected is accomplished through a multitude of short sealed-up tubes, like c c, inclosing a small portion of liquid, which produces instantaneous propagation of heat along the length of the tube, so that the tubes traversing the dividing partition horizontally, as shown, exposed at one end to the descending current and at the other to the one ascending, the heat taken up from the first is at once given off at the other without material variation in temperature at the two ends—an arrangement altogether novel, not before alluded to in the foregoing. To render the tube-surface more ample, it is to be grooved outside.

P is the outer casing of the generator and furnace, Q being the main body of the generator—a strong flat-sided vessel, with round neck at the top, which is suspended over the fire-place S. From the bottom e e hangs three rows of bottle-shaped, heaters like d d, screwed into the bottom, and which are open toward the inside space of the generator, the whole being filled with liquid, that extends upward in the shape of a capacious tubular column, T, from the round part above, terminating at the neck j of the hot recuperator. Within each one of the heaters is suspended a loose tube, g, reaching from above the neck down near the bottom, the object of which is to induce brisk circulation by effectually separating the frothy current of liquid that ascends along the heated surface from the denser one descending at the center.

The fire, after expending the main strength under the heaters, sweeps the outside of the generator, even surrounding the tubular column T, which rises through the middle of the chimney U, and might be made to escape around the recuperator.

The prominent feature of the generator is that it masses such an amount of the most effective surface within the very focus of combustion as almost to exhaust the flame before it leaves the fire-chamber.

This closing the description of the drawings, it may be incidentally remarked that the starting of the engine depends on two conditions—first, to raise the temperature of the recuperator to the required heat through the generator; secondly, to pump up regular working-pressure in the inner chamber of the regenerator through hand-gear.

I desire it to be understood that, as regards the construction of my so-called "recuperators," I limit my claim on the moving tubes to their application within the space traveled by the piston, in combination with stationary tubes to be surrounded with or inclosing liquid.

What I claim as my invention, and desire to secure by Letters Patent, is—

1. The combination of devices hereinabove described for maintaining constant temperature in compression and expansion.

2. The use of an exhaust-pump for developing partial vacuum action through combination of rarefication by piston with condensation by cooling, as stated.

3. A generator containing liquid for transmitting heat through external action to the working-cylinder, substantially as described.

4. Applying the waste heat of the escaping fire-current upon a portion of the cold compressed air to be treated, as described.

5. Feeding the fire with hot air heated through auxiliary regenerator, substantially as described.

6. The use of an expansible receptacle, as stated, in working the same air over and over again.

7. The use of the tubes inclosing liquid for regeneration of heat, as shown and described.

8. The bottle-shaped heaters, with or without the loose tube inside, as applied under the bottom of the generator.

THEODORE SCHWARTZ.

In presence of—
CHARLES NETTLETON,
EDWARD GILBERT.